US008238196B2

(12) United States Patent
Golparian

(10) Patent No.: US 8,238,196 B2
(45) Date of Patent: Aug. 7, 2012

(54) SENSOR MODULE HAVING MULTIPLE PARTS FOR USE IN A WIRELESS SURVEY DATA ACQUISITION SYSTEM

(75) Inventor: Daniel Golparian, Oslo (NO)

(73) Assignee: WesternGeco L.L.C., Houston, TX (US)

( * ) Notice: Subject to any disclaimer, the term of this patent is extended or adjusted under 35 U.S.C. 154(b) by 652 days.

(21) Appl. No.: 12/255,685

(22) Filed: Oct. 22, 2008

(65) Prior Publication Data

US 2010/0097889 A1  Apr. 22, 2010

(51) Int. Cl.
*G01V 1/00* (2006.01)
(52) U.S. Cl. .................... 367/77; 340/870.01
(58) Field of Classification Search .............. 367/77; 340/870.01
See application file for complete search history.

(56) References Cited

U.S. PATENT DOCUMENTS 5,801,632 A    9/1998  Opal
7,660,201 B2 *  2/2010  Fleure et al. .................... 367/50
8,004,933 B2    8/2011  Iseli
2004/0105533 A1 *  6/2004  Iseli ..................... 379/106.01
2007/0286022 A1   12/2007 Bull et al.
2008/0062815 A1    3/2008  Iseli
2009/0153358 A1 *  6/2009  Park et al. .............. 340/870.39

FOREIGN PATENT DOCUMENTS

WO    03054583 A2    7/2003
WO   2007102668 A1   9/2007
WO   2008033969 A2    3/2008

OTHER PUBLICATIONS

Extended European Search Report of European Application Serial No. 09173756.9 dated Nov. 11, 2011.

\* cited by examiner

*Primary Examiner* — Mark Hellner

(57) ABSTRACT

A survey system for acquiring survey data representative of a subterranean structure includes a plurality of sensor modules. Each of at least some of the plurality of sensor modules includes a wireless transceiver to communicate wireless signals with another component in the survey system, and a plurality of parts. A first of the plurality of parts is detachably attached to a second of the plurality of parts, with the first part including a sensor, and the second part including a power source and a non-volatile storage.

22 Claims, 7 Drawing Sheets

SENSOR MODULE HAVING MULTIPLE PARTS FOR USE IN A WIRELESS SURVEY DATA ACQUISITION SYSTEM

TECHNICAL FIELD

The invention relates generally to a sensor module having multiple parts for use in a wireless survey data acquisition system.

BACKGROUND

Seismic or electromagnetic (EM) surveying can be performed for identifying and characterizing subterranean elements, such as hydrocarbon reservoirs, fresh water aquifers, gas injection reservoirs, and so forth. With seismic surveying, one or more seismic sources are placed in various locations above a land surface or sea floor, with the seismic sources activated to generate seismic waves directed into the subterranean structure.

The seismic waves generated by a seismic source travel into the subterranean structure, with a portion of the seismic waves reflected back to the surface for receipt by seismic receivers (e.g., geophones, hydrophones, accelerometers, etc.). These seismic receivers produce signals that represent detected seismic waves. Signals from the seismic receivers are processed to yield information about the content and characteristic of the subterranean structure.

EM surveying involves deployment of one or more EM sources that produce EM waves that are propagated into the subterranean structure. EM signals are affected by elements in the subterranean structure, and the affected EM signals are detected by EM receivers, which are then processed to yield information about the content and characteristic of the subterranean structure.

In certain applications, a survey system for performing surveying of a subterranean structure can include survey receivers that contain non-volatile storage for storing measured survey data. To retrieve data stored in the non-volatile storage of a survey receiver, conventional techniques typically involve removing the entire survey receiver from the field and returning it to a central site to allow data stored in the non-volatile storage of the survey receiver to be downloaded. However, removing entire survey receivers (particularly when there are a relatively large number of such survey receivers) from the field for the purpose of downloading data stored in such survey receivers, followed by re-deploying such survey receivers in the field, can be a time consuming and labor-intensive process. Typically, a sensor portion of the survey receiver is buried in the earth. Thus, re-deploying a previously removed survey receiver means that the sensor portion of the survey receiver will later have to be re-buried into the earth.

In addition to being time-consuming and labor-intensive, removing entire survey receivers from the field for the purpose of downloading data also results in relatively lengthy downtime during which survey data cannot be acquired.

SUMMARY

In general, a survey data acquisition system includes sensor modules (or survey receivers) each having multiple parts such that one part of each sensor module can remain in the survey field while another part of the sensor module is returned to a central site to download survey data contained in non-volatile storage of the sensor module as well as to recharge an energy source of the sensor module.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1:
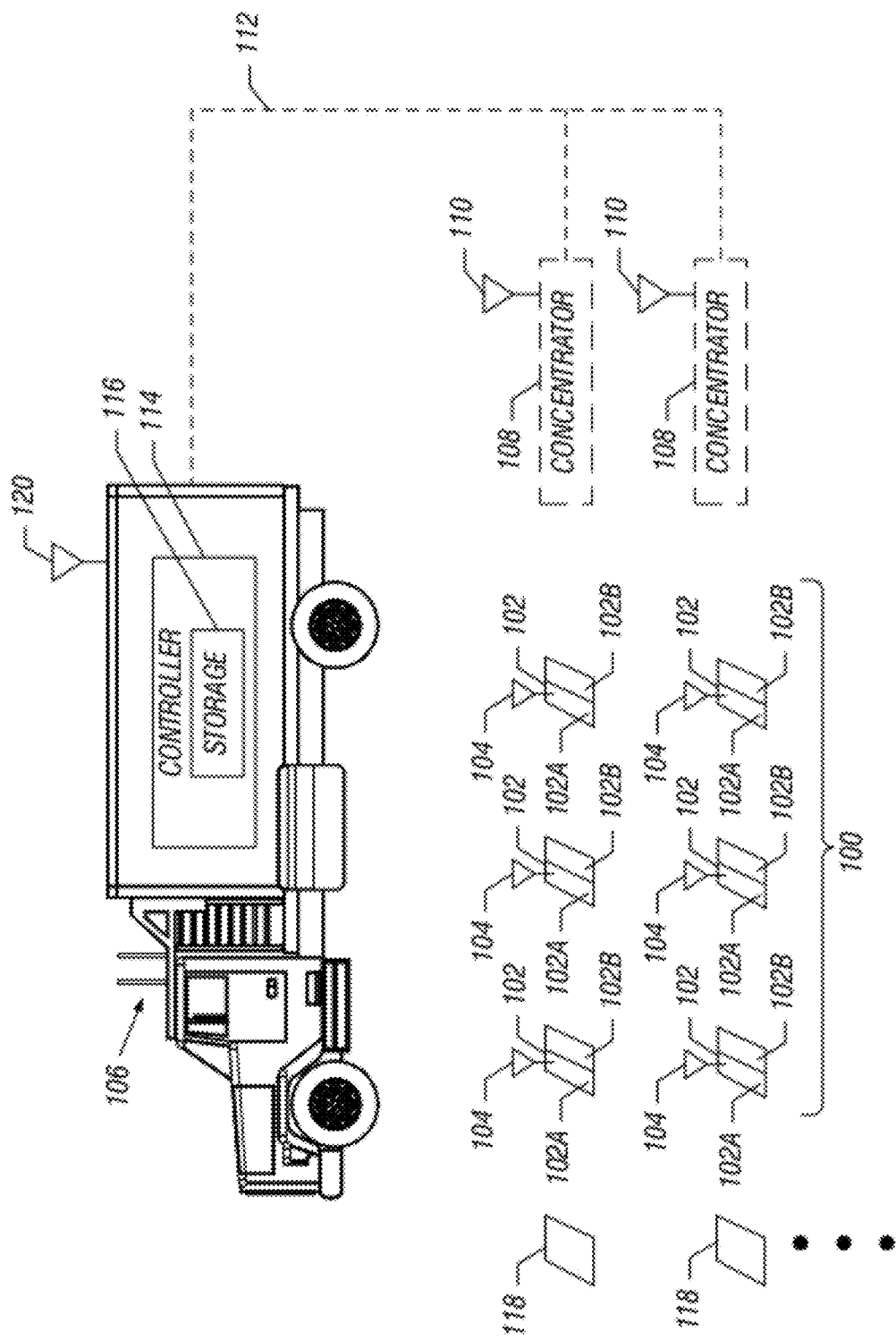
FIG. 1 depicts an example of a land-based survey data acquisition system including sensor modules according to some embodiments of the invention.

FIG. 1 depicts an example of a land-based survey data acquisition system that includes an arrangement 100 of sensor modules (survey receivers) 102 deployed in a survey area for detecting signals affected by subterranean elements in a subterranean structure underneath the survey area. Each of the sensor modules 102 includes an antenna 104 that allows the sensor modules 102 to wirelessly transmit survey data collected by each corresponding sensor module 102. The survey data can be directly wirelessly transmitted by the sensor modules 102 to a recording station 106 (e.g., a recording truck), or alternatively, the survey data can be wirelessly transmitted from the sensor modules through one or more concentrator units 108 to the recording station 106. A "concentrator unit" refers to a communications module that routes data between nodes of a survey data acquisition system. The recording station 106 includes an antenna 120 to enable the recording station 106 to wirelessly receive measurement data from the sensor modules 102.

The received measurement data can be stored in a storage 116 of the recording station 106. The storage 116 is associated with a controller 114 in the recording station 106. The controller 114 can be a computer or some other type of electronic device.

As further depicted in FIG. 1, each concentrator unit 108 includes an antenna 110 to perform wireless communication with sensor modules 102, such as with antennas 104 of the sensor modules 102. The concentrator units 108 can in turn be optionally connected to a wired network 112 that is connected to the recording station 106. Alternatively, the concentrator units 108 can communicate wirelessly with the recording station 106, in which case an additional antenna would be provided with each concentrator unit. Note that the concentrator units 108 can be omitted in some implementations. In other implementations, several levels of concentrator units may relay the data between the sensor modules and the recording station.

FIG. 1 also depicts survey sources 118, such as seismic sources or EM sources, which are provided to generate survey signals when activated. The survey signals (seismic signals or EM signals) are propagated into the subterranean structure underneath the survey area. Signals that are affected by subterranean elements of the subterranean structure are detected by the sensor modules 102.

Note that FIG. 1 depicts one exemplary implementation of the sensor modules 102—numerous alternative configurations of the survey data acquisition system depicted in FIG. 1 are possible.

The survey data acquisition system of FIG. 1 can be a real-time wireless survey data acquisition system, in which survey data acquired by the sensor modules 102 are normally communicated for receipt by the recording station 106 on a real-time basis. A "real-time" wireless survey data acquisition system refers to a wireless survey data acquisition system in which data is communicated from sensor modules, either directly or indirectly through one or more concentrator units, to the recording station 106 within acceptable delay limits. An "acceptable delay limit" refers to a delay in communication of survey data from a sensor module to a recording station (directly or indirectly) within an amount of time in which an operator is able to determine whether or not the particular "shot" (activation of a survey source such as a seismic source or EM source) has resulted in the acquisition of data that is acceptable (that meets one or more predefined criteria of the operator).

In a real-time wireless survey data acquisition system, the survey data is "normally" transmitted to the recording station in real time. However, under certain scenarios, such as due to loss of wireless links (e.g., excessively high data error rates are present) or failure of communications equipment, the real-time mode of operation may not be possible. In accordance with some embodiments, the wireless survey data acquisition system can also operate in a non-real-time mode of operation when the real-time mode of operation is unavailable.

In the non-real-time mode of operation, the sensor modules 102 are able to store survey data in non-volatile storage in each corresponding sensor module 102. The survey data stored in the non-volatile storage of each sensor module 102 can later be retrieved, using techniques according to some embodiments as discussed further below.

In accordance with some embodiments, each of the sensor modules 102 depicted in FIG. 1 has at least two parts 102A and 102B. The two parts 102A and 102B of each sensor module 102 are detachably connected together such that the second (removable) part 102B can be detached from the first (fixed) part 102A and transported to a desired location (e.g., central camp) to allow survey data stored in the non-volatile storage (contained in the second part 102B) to be downloaded to a processing system at the remote location, while the first (fixed) part 102A remains deployed in the survey area. The first (fixed) part 102A can continue to perform survey data acquisition with no downtime due to presence of a backup power module in the fixed part 102A.

In addition to containing the non-volatile storage, the removable part 102B also includes an energy source, such as a battery pack, that provides power for the sensor module 102 when the fixed and removable parts 102A and 102B are connected together.

The fixed part 102A includes at least a wireless transceiver to enable wireless communications through the antenna 104, as well as a sensor for receiving signals corresponding to survey data.

Additional exemplary components that may be in the fixed and removable parts 102A and 102B are discussed further below.

Although each of the sensor modules 102 depicted in FIG. 1 is configured with two detachable parts, it is noted that in an alternative embodiment, some of the sensor modules 102 can be configured as an integrated unit without detachable parts.

Figure 2:
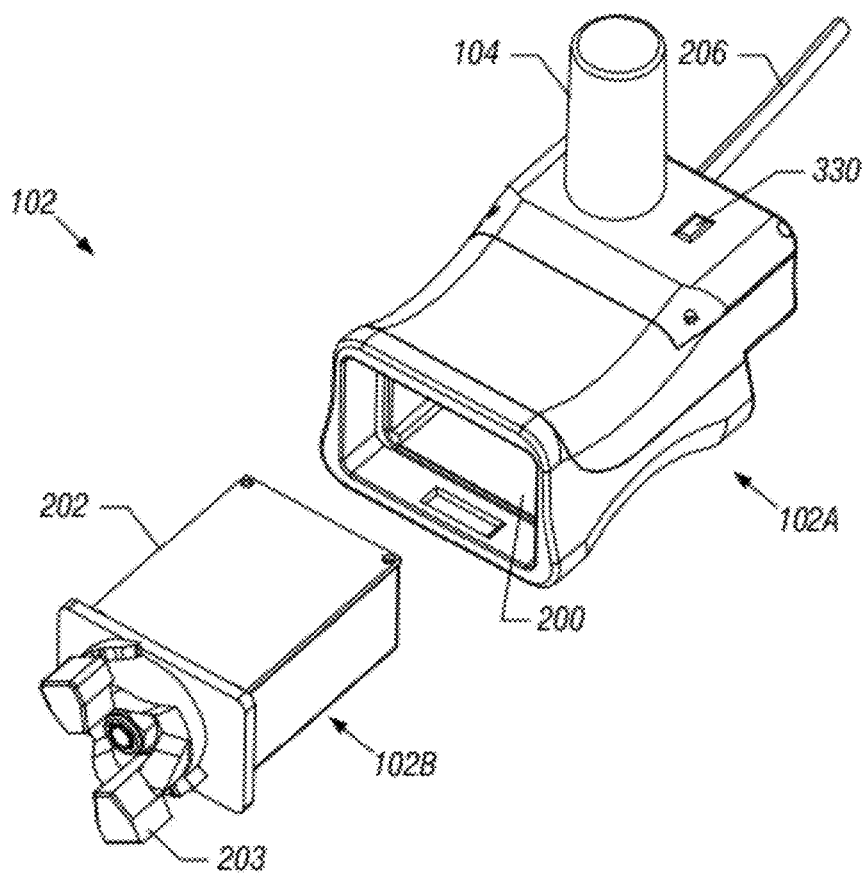
FIG. 2 illustrates first and second parts of a sensor module in a detached arrangement.
Figure 3:
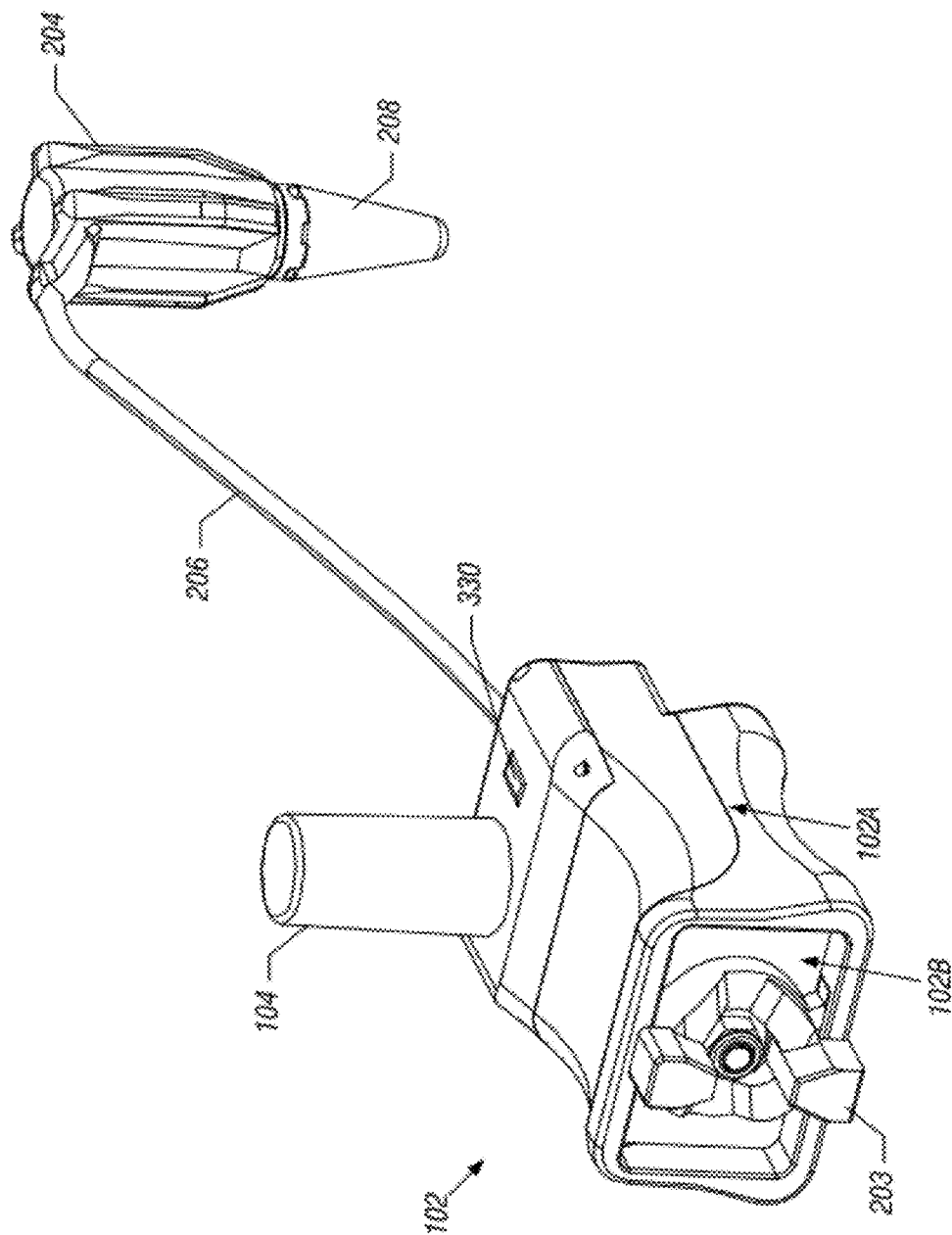
FIG. 3 illustrates first and second parts of a sensor module in an attached arrangement.

FIG. 2 illustrates the two parts 102A and 102B of a sensor module 102 in a disconnected or detached arrangement. In the exemplary implementation depicted in FIG. 2, the fixed sensor module part 102A has a receptacle 200 for receiving a portion 202 of the removable sensor module part 102B. The assembled view of the sensor module 102 is depicted in FIG. 3, in which the removable part 102B has been fully inserted into the fixed part 102A. The fixed sensor module part 102A also has an activation button 330 for turning on/off the sensor module (discussed further below).

In an alternative implementation, the removable part 102B can be provided with a receptacle, while the fixed part 102A is received in the receptacle of the removable part 102B. Alternatively, instead of using a receptacle-based attachment mechanism, other types of attachment mechanisms can be used instead.

As depicted in FIG. 3, a sensor 204 is connected by a flexible electrical cable 206 to the fixed sensor module part 102A. The sensor 204 has an anchor piece 208 to enable a portion of the sensor 204 to be buried in an earth surface. The sensor 204 includes either a seismic sensing element or an EM sensing element, or both. Note that presence of the cable 206 allows a user to more easily manipulate the sensor 204 for burying the anchor piece 208 in the earth surface.

In an alternative implementation, instead of attaching the sensor 204 using the flexible cable 206 to the fixed sensor module part 102A, the sensor 204 with the anchor piece 208 can be fixedly attached to the fixed sensor module part 102A.

Figure 4A:
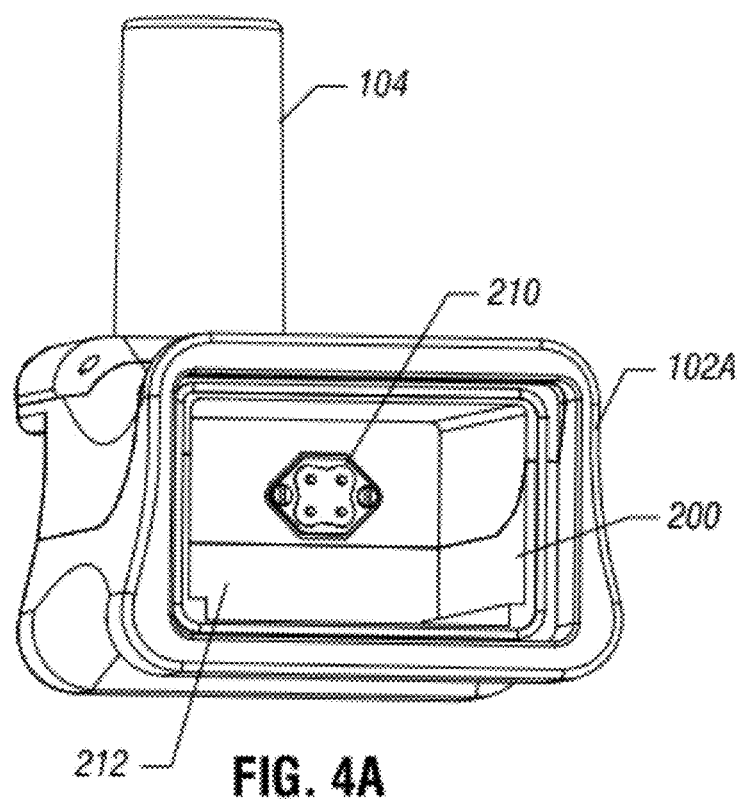
FIGS. 4A-4B are perspective views of the first sensor module part.
Figure 4B:
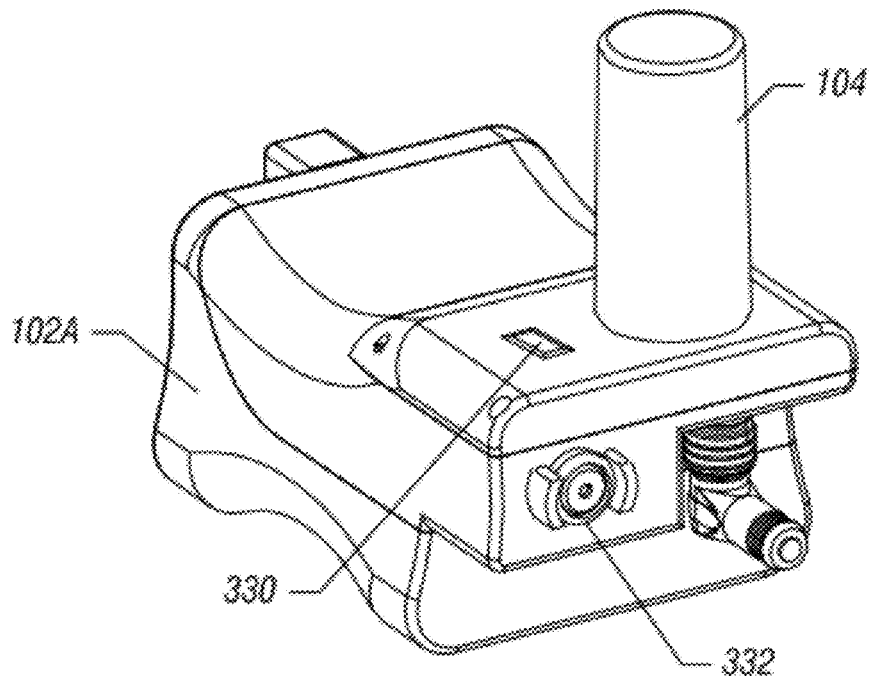

A different view of the fixed sensor module part 102A is depicted in FIG. 4A to show an electrical connector 210 that is provided on a rear surface 212 within the receptacle 200 of the fixed sensor module part 102A. The electrical connector 210 is positioned to mate with a corresponding electrical connector 214 (FIG. 5) on the removable sensor module part 102B when the removable sensor module part 102B is inserted into the receptacle 200 of the fixed sensor module part 102A and pushed up against the rear surface 212 of the receptacle 200. FIG. 4B shows another view of the fixed sensor module part 102A, which depicts an external power connector 332 for connection to an external power source (described further below).

Figure 5:
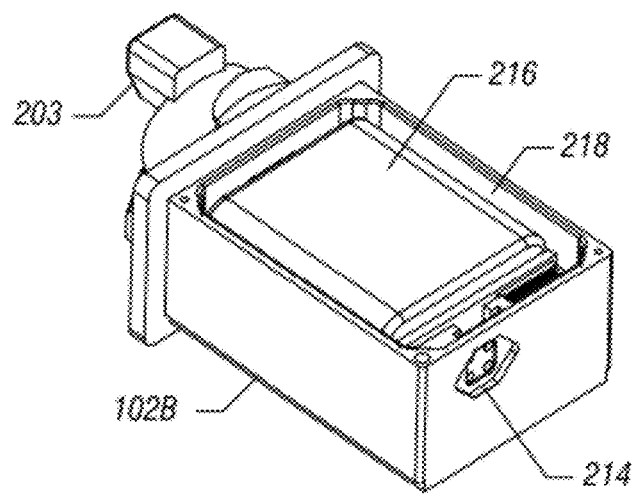
FIG. 5 is a top perspective view of the second sensor module part.

In the view of FIG. 5, a top cover of the removable sensor module part 102B has been removed to show a battery pack 216 (as well as other components) inside a chamber 218 of the removable sensor module part 102B.

In operation, it is relatively easy to attach or detach the fixed and removable sensor module parts 102A and 102B. The mechanism depicted includes a "twist-and-lock/unlock" mechanism which allows easy and rapid replacement of old removable sensor module parts 102B with new ones. Alternatively other locking mechanisms can also be implemented. With the twist-and-lock/unlock mechanism depicted, a user can easily grab the butterfly shaped handle 203 to attach/ detach the replaceable and fixed parts. A user can grab the handle 203 of the removable sensor module part 102B to detach the removable part 102B from the fixed part 102A, leaving the fixed part 102A with its sensor 204, deployed in the survey area, while the removable part 102B is transported to a central location to allow data stored in a non-volatile storage of the removable part 102B to be downloaded at the central location, and to allow the battery pack 216 in the removable part 102B to be recharged. At the central location, downloading of data from the non-volatile storage and recharging of the battery pack 216 in the removable sensor module part 102B can be performed simultaneously. Moreover, for improved efficiency, a relatively large number of removable sensor module parts 102B can be connected at the same time to a system for downloading data and recharging batteries.

Note that when the removable sensor module part 102B is removed from the fixed sensor module part 102A, a replacement removable sensor module part 102B can be connected to the fixed sensor module part 102A. The replacement removable sensor module part 102B can include a fully charged battery pack such that the sensor module including the fixed sensor module part 102A and the replacement removable sensor module part 102B can continue to acquire survey data.

After data has been downloaded from the non-volatile storage of a removable sensor module part 102B that has been returned to the central location, and after its battery pack 216 has been recharged, the removable sensor module part 102B can be returned to the survey area to allow connection of the removable sensor module part 102B with a fixed sensor module part 102A.

Figure 6:
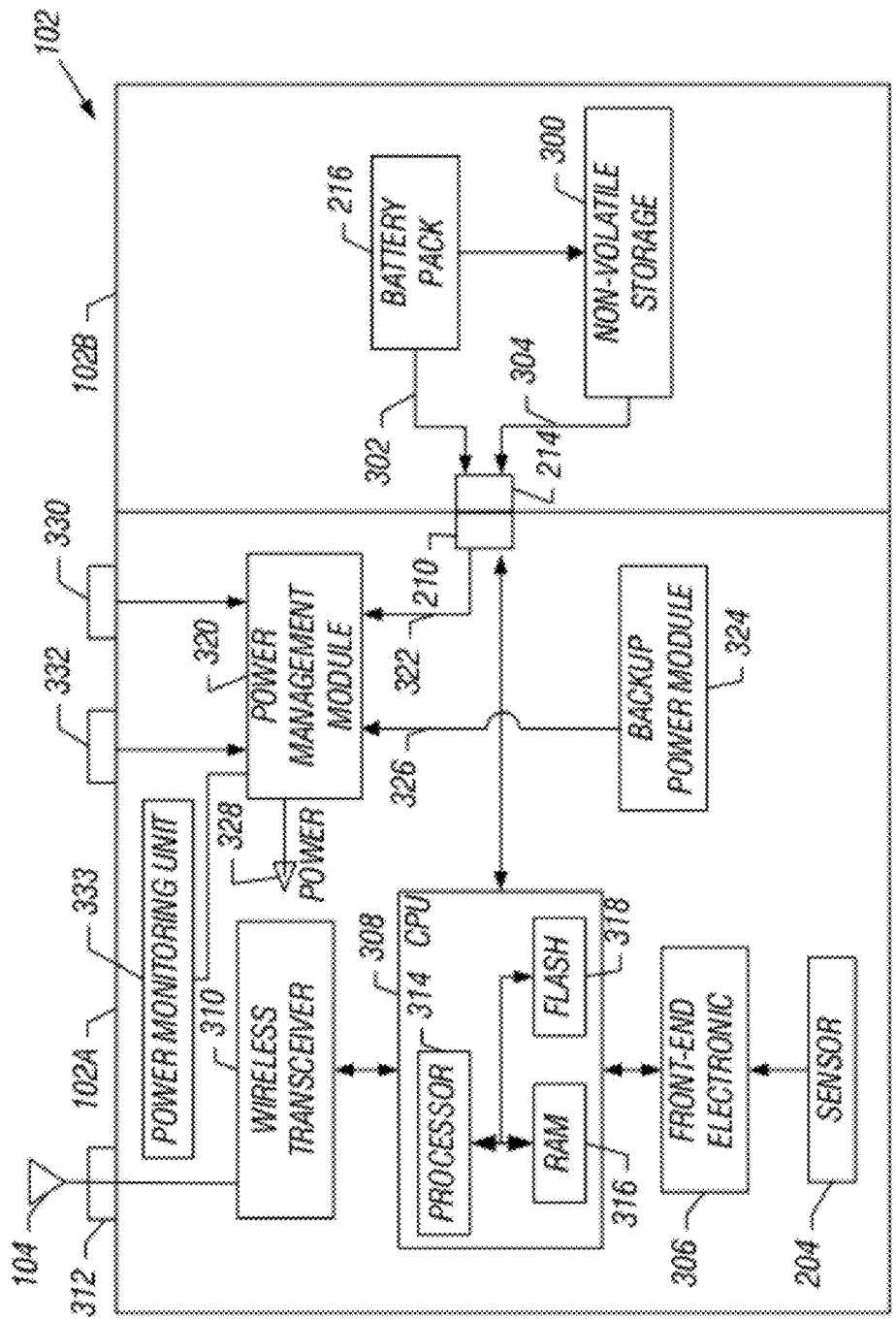
FIG. 6 is a block diagram of components in the first and second sensor module parts, according to an embodiment.

FIG. 6 is schematic diagram of components within the fixed and removable parts 102A and 102B of a sensor module 102 according to some embodiments. As depicted in FIG. 6, the removable part 102B contains the battery pack 216 and the non-volatile storage 300, which is electrically connected to the battery pack 216 to receive power from the battery pack 216.

Power from the battery pack 216 can also be provided over conductive line(s) 302 to an electrical connector 214 (of the removable part 102B), which is electrically connected to an electrical connector 210 of the fixed part 102A. The conductive line(s) 302 allow(s) power from the battery pack 216 to be provided to components in the fixed part 102A when the fixed and removable parts 102A and 102B are connected.

A data bus 304 is provided between the non-volatile storage 300 and the electrical connector 214 to allow survey data collected by the sensor 204 in the fixed part 102A to be stored in the non-volatile storage 300 of the removable part 102B.

In the fixed part 102A, the sensor 204 is electrically connected to front-end electronic circuitry 306 (which can include an analog-to-digital converter, signal amplifier, and/or other electronic circuitry) for processing measurement data received from the sensor 204. The measurement data processed by the front-end electronic circuitry 306 is sent to a central processing unit (CPU) 308 of the fixed part 102A. The electrical connection between the CPU 308 and the front-end electronic circuitry 306 can be provided by cable 206 (FIG. 3), or alternatively, the connection can be in the form of conductive traces on a printed circuit board.

The CPU 308 is in turn connected to a wireless transceiver 310, which is connected by an antenna connector 312 to the antenna 104 of the fixed sensor module part 102A. In the real-time mode of operation, the CPU 308 is able to transmit survey data through the wireless transceiver 310 for wireless communication over the antenna 104 (for receipt by the recording station 106 or by a concentrator unit 108).

As further depicted in FIG. 6, the CPU 308 includes a processor 314 that may be connected to a random access memory (RAM) 316 (or other type of volatile memory) and a flash memory 318 (or other type of non-volatile memory). The processor 314 is able to execute software instructions to allow the fixed sensor module part 102A to perform its respective tasks, which includes collection of measurement data.

In the example of FIG. 6, a power management module 320 is also provided in the fixed sensor module part 102A. The power management module 320 receives power from the battery pack 216 over the conductive line(s) 302, electrical connectors 210 and 214, and conductive line(s) 322 in the fixed part 102A. The power management module 320 also receives power from a backup power module 324, which supplies one or more power voltages over one or more conductive lines 326 to the power management module 320.

The backup power module 324 can provide power when the battery pack 216 is unavailable (e.g., the removable part 102B has been detached from the fixed part 102A, or the charge in the battery pack 216 has depleted). This allows for zero downtime when old removable parts 102B are being replaced with new ones. The backup power module 324 can be in the form of a battery, a super-capacitor, or other energy source. When the fixed and removable parts 102A and 102B are connected, the battery pack 216 can recharge the backup power module 324.

Also depicted in the example of FIG. 6 is an external power connector 332 that is connected to the power management module 320. The external power connector 332 allows the fixed sensor module part 102A to be connected to an external power source to supply additional power to the components of the fixed part 102A.

Using the power supplied by the battery pack 216, the backup power module 324, or the external power source, the power management module 320 is able to supply a power voltage (or multiple power voltages) 328 to power the wireless transceiver 310, CPU 308, front-end electronic circuitry 306, and sensor 204.

Also depicted in the example of FIG. 6 is an activation button 330 that is connected to the power management module 320. A user can actuate the activation button 330 to turn on or turn off the sensor module 102.

It is important to use the battery's limited energy in an efficient way. The activation button 330 will be typically turned on after a field crew has placed the sensors at their planed positions. Prior to the final placement of the sensor modules, the activation button 330 will be turned off to save power.

As further depicted in FIG. 6, a power monitoring unit 333 is included in the fixed part 102A. The power monitoring unit 333 includes one or several mechanisms, such as LEDs (light emitting diodes) or buzzers, connected to the power management unit 333, which can indicate the status of different power sources to a field crew or to indicate other information.

The electrical connectors 210 and 214 can include electrical contacts to enable connection of an electrical bus (e.g., a Universal Serial Bus or USB) for communicating data between the fixed and removable parts 102A and 102B. In addition, the electrical connectors 210 and 214 can include power contacts to allow power to be provided between the fixed and removable parts.

Note that the electrical connector 214 of the removable part 102B can also connect to a corresponding connector of a system located at the central location to allow downloading of data from the non-volatile storage of the removable part 102B, as well as recharging of the battery pack of the removable part 102B.

As noted above, due to problems associated with the integrity of the wireless link, the sensor module can switch from a real-time operating mode to a non-real-time mode. In the non-real-time operating mode, data is recorded into the non-volatile storage of each of the sensor modules 102. Upon detection of a good wireless link quality, the sensor module can return to the real-time operating mode and start sending the survey data collected by the sensor module wirelessly. Data recorded in the non-volatile storage can be retrieved by detaching the removable sensor module part 102B and returning the removable sensor module part 102B to the central location.

Events that may prompt the detachment of a removable sensor module part 102B can include one or more of the following: (1) battery low condition, and (2) data contained in the non-volatile storage should be downloaded. These events may either be reported by the sensor module to the recording station or be observed through the power monitoring unit by the field crew.

In response to detection of one or more such events, a field crew can identify the removable sensor module parts 102B deployed in the field that should be brought back to the central location. Such identified removable parts 102B are then detached from the corresponding fixed parts 102A. Replacement removable parts 102B containing recently charged battery packs can be connected to respective fixed parts 102A. During this process, the fixed parts 102A remain in their respective fixed positions in the earth surface, and potentially could continue to acquire data (and also to transmit data wirelessly in real time). The backup power module 324 (FIG. 6) of each fixed part 102A is able to supply power to the fixed part 102A when the corresponding removable part 102B is detached.

Figure 7:
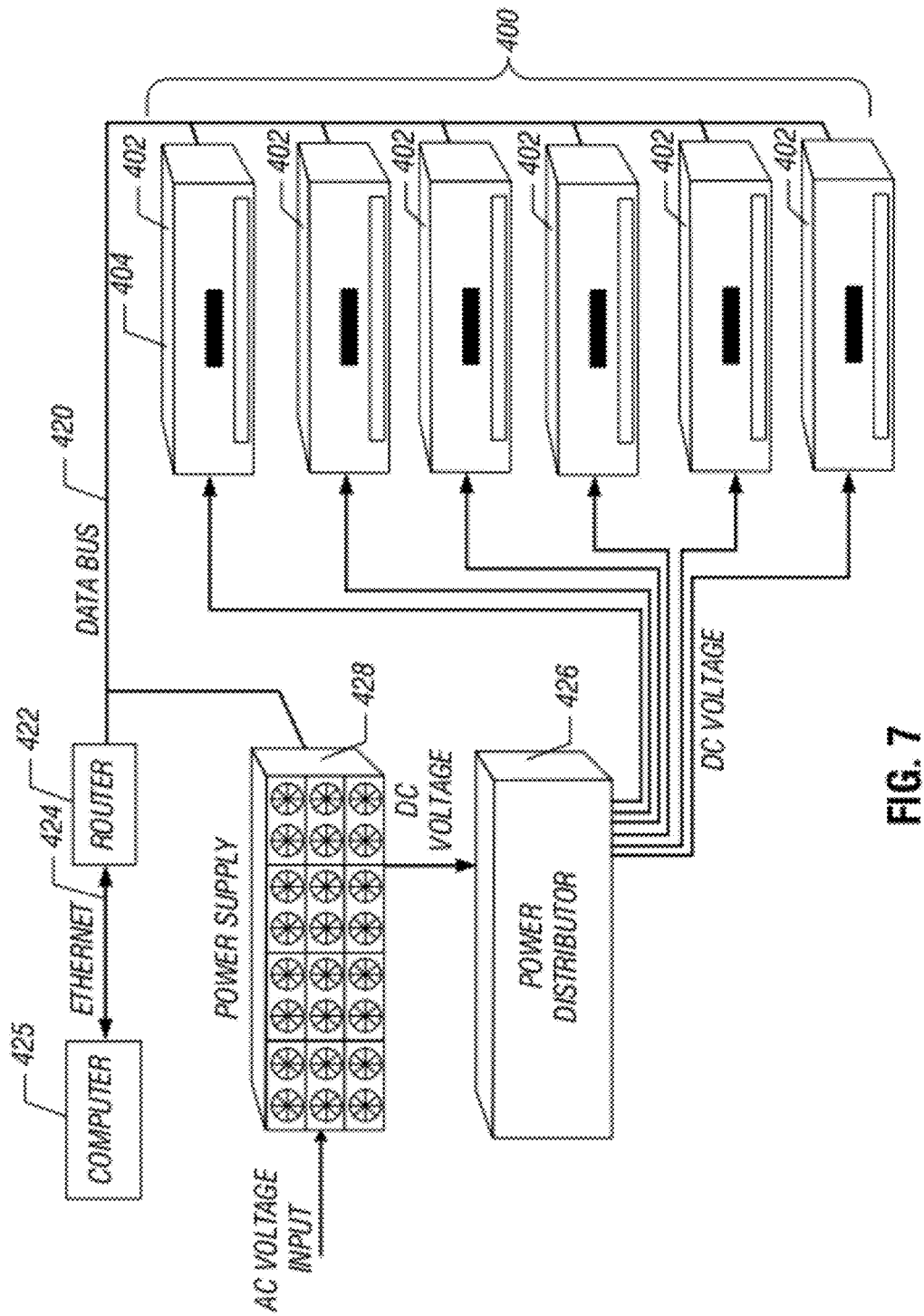
FIG. 7 is a schematic diagram of equipment at a central location that is able to accept multiple second sensor module parts for downloading data from the second sensor module parts and to recharge battery packs in the second sensor module parts.

It is noted that in a typical survey area, there can be a relatively large number (several thousands) of sensor modules. Thus, potentially, the field crew may remove a relatively large number of removable parts 102B for transport back to the remote location for the purpose of downloading data and/or recharging battery packs. For better time efficiency, as depicted in FIG. 7, a rack 400 of drawers 402 can be deployed at the central location (e.g., camp) for receiving the removable sensor module parts 102B that have been transported from the survey area.

Figure 8:
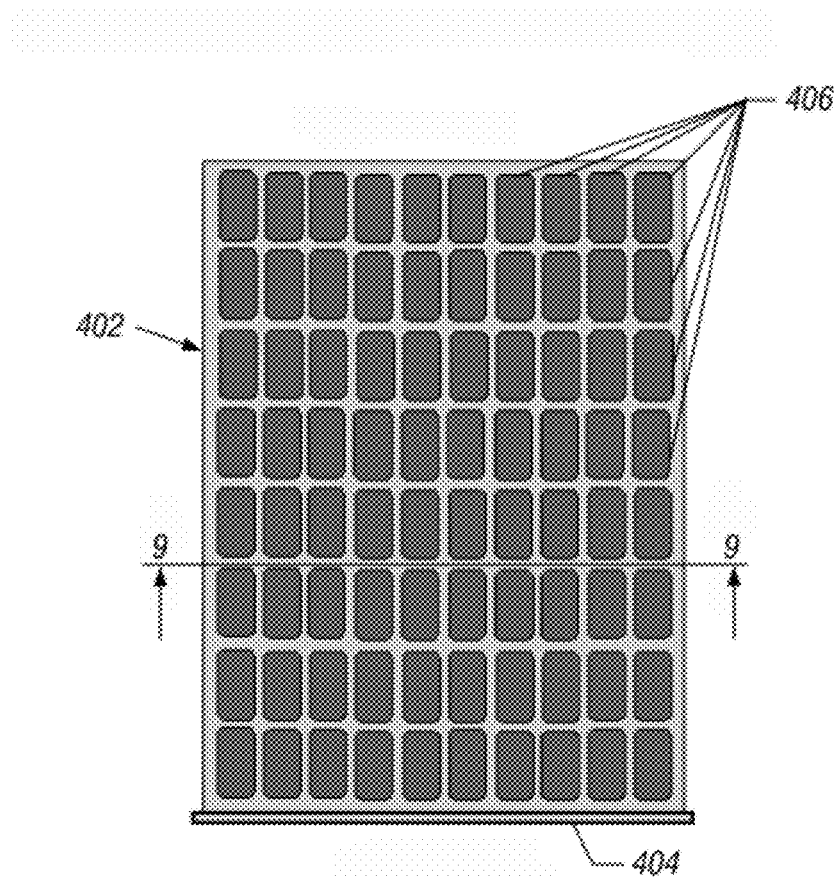
FIG. 8 is a top schematic view of a drawer in the equipment of FIG. 7 that is able to receive an array of second sensor module parts.

Each drawer 402 has a front panel 404 that can be pulled outwardly to expose receptacles 406 in the drawer 404, as depicted in FIG. 8. Each receptacle 406 is able to receive a corresponding removable sensor module part 102B. The receptacle 406 can have the same or similar mechanical configuration as the receptacle 200 in the fixed sensor module part 102A shown in FIGS. 2-5. Each receptacle 406 in the drawer 404 includes a corresponding electrical connector for connection to the electrical connector 214 of the removable sensor module part 102B. Each receptacle also includes separate charger circuitry.

The receptacles 406 in the drawer 402 are arranged as an array. Note that the drawer shown in FIG. 8 can receive a relatively large number (e.g., 80) of removable sensor module parts 102B.

Figure 9:
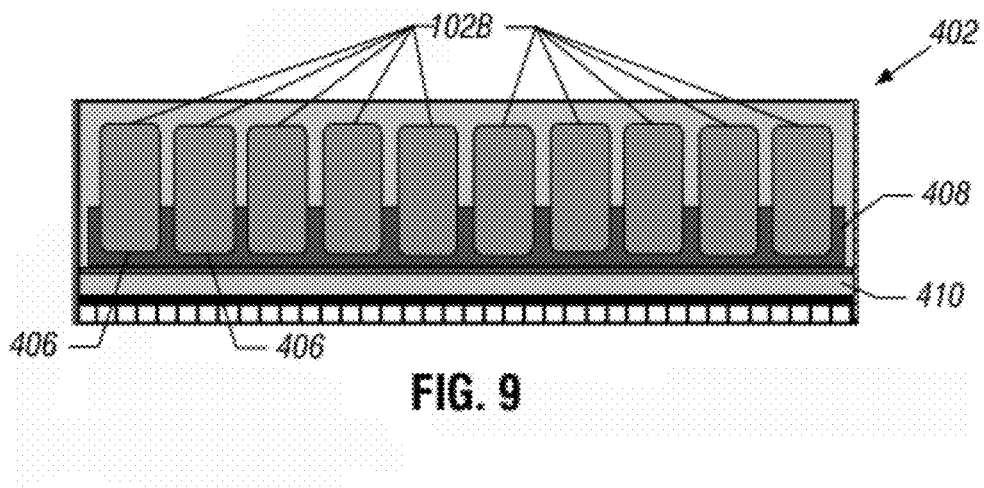
FIG. 9 is a side cross-sectional view of the drawer of FIG. 8.

A cross-section of the drawer 402 along line 9-9 is depicted in FIG. 9. As shown in FIG. 9, a row of removable sensor module parts 102B are inserted into corresponding receptacles 406 of the drawer 402. The receptacles 406 are provided by a holder 408 mounted in the drawer 402.

The holder 408 is mounted on a circuit board 410. The circuit board 410 has electrically conductive traces electrically connected to electrical contact points of the holder 408, such that electrical connection can be made between the circuit board 410 and the removable sensor module parts 102B that have been inserted into the receptacles 406 of the holder 408. In this way, both power and data connections are provided between the circuit board 410 and the removable sensor module parts 102B.

As further depicted in FIG. 7, a local data bus 420 (e.g., a CAN or controller area network bus) is connected to each of the drawers 402 to allow for data communication between the drawers 402 and a router 422. The router 422 is able to forward data on the data bus 420 to an external network 424, such as an Ethernet network. The network 424 enables the entire system to be connected to a computer 425 for control and monitoring of data download and battery recharge of each individual location 406 of the rack.

Data from the non-volatile storage 300 (FIG. 6) of a removable part 102B is downloaded and transferred to a memory of the computer 425 while the battery pack 216 is being charged. Later on, this data will be merged with the rest of the data that was sent in real time by the sensor module to the recording station.

All battery packs within each removable part 102B are treated, monitored and controlled individually from the computer 425.

Also, current, historical and status data for each battery pack is stored in the computer 425 and can be displayed if needed. Some examples of the status information include: charging status, capacity check status, and battery quality check status. The statistics for each individual battery pack can be read from the computer 425. This will show the development on critical parameters over time. Based on the acquired measurement data on each battery pack, its expected lifetime can be calculated and displayed.

Also, each battery pack can be fully charged and discharged before a final charging in order to determine its capacity. The data about the capacity is stored in the computer 425, and a warning is given when the battery capacity is below a predefined critical level. If a battery is faulty in any way and will not function properly, a warning is given.

Some battery types require a certain state of charge before storage. For a Li-Ion (lithium ion) battery for example, this is normally between 20% and 30% of full capacity. Storage preparation thresholds can be set up from the computer 425 and the battery packs can be charged or discharged to the threshold value prior to storage.

If a new battery charging/discharging algorithm is necessary, it can also be easily downloaded to all the chargers located in each receptacle 406 simultaneously from the computer 425.

Power to the drawers 402 is provided by a power distributor 426, which is connected to a power supply 428. The power supply 428 receives an AC voltage input, typically from a three-phase diesel generator or from main power lines. The power supply 428 converts the AC voltage to a DC voltage, which is provided to the power distributor 426 for distribution to the drawers 402. Power from the power supply 428 is used to charge the battery packs in the removable sensor module parts 102B inserted in the receptacles 406 of the drawers 402.

In this manner, download of data from non-volatile storage and recharging of battery packs can be simultaneously performed with respect to a relatively large number of removable sensor module parts 102B inserted in the drawers 402.

While the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A survey system for acquiring survey data representative of a subterranean structure, comprising:
a plurality of sensor modules, wherein each of at least some of the plurality of sensor modules comprises:
a wireless transceiver to communicate wireless signals with another component in the survey system;
a plurality of parts, wherein a first of the plurality of parts is detachably attached to a second of the plurality of parts, the first part including a sensor, and the second part including a power source and a non-volatile storage, and
wherein a particular one of the plurality of sensor modules is configured to switch from a first operating mode to a second, different operating mode in response to detection of loss of wireless communication by the particular sensor module, and
wherein the particular sensor module is to return from the second operating mode to the first operating mode upon detecting availability of the wireless communication following the loss of the wireless communication.

2. The survey system of claim 1, wherein the wireless transceiver is contained in the first part.

3. The survey system of claim 1, wherein the second part is detachable from the first part to enable the first part to remain deployed in a survey area while the second part is transported to a central location for downloading data from the non-volatile storage to a system at the central location.

4. The survey system of claim 1, wherein the first part has a first connector and the second part has a second connector, the first connector and second connector to form a detachable electrical connection.

5. The survey system of claim 1, wherein each of the at least some of the sensor modules further comprises:
a processor to transmit survey data wirelessly during a real-time mode of operation, the wirelessly transmitted survey data for storage by a recording station.

6. The survey system of claim 5, wherein the processor is to store survey data in the non-volatile storage during a non-real-time mode of operation.

7. The survey system of claim 1, wherein the sensor is connected by a flexible cable to the first part, and wherein the sensor further includes an anchor piece for burying in an earth surface.

8. The survey system of claim 1, wherein each of the first and second parts includes a corresponding connector that has contacts for signal communication and one or more contacts for provision of power.

9. A survey system for acquiring survey data representative of a subterranean structure, comprising:
a plurality of sensor modules, wherein each of at least some of the plurality of sensor modules comprises:
a wireless transceiver to communicate wireless signals with another component in the survey system;
a plurality of parts, wherein a first of the plurality of parts is detachably attached to a second of the plurality of parts, the first part including a sensor, and the second part including a power source and a non-volatile storage; and
a rack having a plurality of receptacles to receive a corresponding number of second parts, the rack to enable simultaneous download of data from the second parts and recharging of power sources in the second parts mounted in the receptacles.

10. The survey system of claim 1, wherein the first part further includes a backup power module to supply backup power to the first part when the second part is detached.

11. The survey system of claim 10, wherein the first part further includes a power management module to receive power from the backup power module and the second part, and to output power to components of the first part.

12. The survey system of claim 1, wherein each sensor module further includes a twist and lock/unlock mechanism to enable attachment or detachment of the plurality of parts of the corresponding sensor module.

13. A method of acquiring survey data, comprising:
deploying a plurality of sensor modules in a survey area, wherein at least some of the sensor modules has a fixed part and a removable part, the removable part including a non-volatile storage and a power source, and the fixed part including a sensor to detect signals affected by a subterranean structure;
detaching the removable part from the fixed part of a particular one of the sensor modules;
transporting the removable part to a central location to download survey data from the non-volatile storage of the detached removable part and to recharge the power source of the detached removable part; and
mounting detached removable parts in a rack at the central location for simultaneous download of survey data and recharging of power sources of the detached removable parts.

14. The method of claim 13, further comprising:
operating the sensor modules in a real-time mode of operation to cause the sensor modules to wirelessly transmit survey data from the sensor modules to a recording station.

15. The method of claim 14, further comprising:
in response to a predetermined condition, operating the sensor modules in a non-real-time mode of operation in which survey data is recorded in the non-volatile storage of the removable parts.

16. The method of claim 13, further comprising:
after detaching the removable part from the fixed part of the particular sensor module, attaching a replacement removable part to the fixed part of the particular sensor module, wherein the replacement removable part has a more recently recharged power source.

17. The method of claim 13, further comprising:
detaching additional removable parts from respective fixed parts of other sensor modules; and
transporting the additional removable parts to the central location to download survey data from the non-volatile storage of the additional removable parts and to recharge the power sources of the additional removable parts.

18. The method of claim 13, wherein mounting the detached removable parts in the rack comprises mounting the detached removable parts in a drawer having a plurality of receptacles.

19. A sensor module comprising:
a first part and a second part, wherein the first part has a sensor to receive signals affected by a subterranean structure, and a wireless transceiver to transmit survey data wirelessly,
wherein the second part has a non-volatile storage and a power source, the non-volatile storage to store survey data, the first and second parts having connection mechanisms to enable the first and second parts to be mechanically and electrically detachably connected; and a processor to switch the sensor module from a first operating mode to a second, different operating mode in response to detection of loss of wireless communication by the sensor module, and the processor to return the sensor module from the second operating mode to the first operating mode upon detecting availability of the wireless communication following the loss of the wireless communication.

20. The sensor module of claim 19, wherein the first operating mode is a real-time mode and the second operating mode is a non-real-time mode, wherein the processor is to wirelessly transmit the survey data during the real-time mode, and wherein the processor is to record the survey data in the non-volatile storage during the non-real-time mode.

21. The survey system of claim 1, wherein the particular sensor module in the first operating mode is to communicate data acquired by the sensor of the particular sensor module using the wireless transceiver of the particular sensor module, and wherein the particular sensor module in the second operating mode is to record the data acquired by the sensor of the particular sensor module in the non-volatile storage of the particular sensor module.

22. The sensor module of claim 19, wherein the sensor module in the first operating mode is to communicate the survey data acquired by the sensor using the wireless transceiver, and wherein the sensor module in the second operating mode is to record the survey data acquired by the sensor in the non-volatile storage.

* * * * *